United States Patent [19]

Nakamura

[11] Patent Number: 5,144,682
[45] Date of Patent: Sep. 1, 1992

[54] METHOD AND AN APPARATUS FOR ISOLATING AN AREA CORRESPONDING TO A CHARACTER OR WORD

[75] Inventor: Masahiro Nakamura, Yokohama, Japan

[73] Assignee: Ricoh Company, Ltd., Japan

[21] Appl. No.: 441,154

[22] Filed: Nov. 22, 1989

Related U.S. Application Data

[63] Continuation-in-part of Ser. No. 161,142, Feb. 26, 1988, abandoned.

Foreign Application Priority Data

Mar. 5, 1987 [JP] Japan ............................... 62-051025
May 1, 1987 [JP] Japan ............................... 62-108552

[51] Int. Cl.$^5$ .......................... G06K 9/34; G06K 9/48; G06K 9/46; G06K 9/20
[52] U.S. Cl. .......................................... 382/9; 382/22; 382/26; 382/48
[58] Field of Search ................... 382/9, 47, 48, 56, 21, 382/22, 26

[56] References Cited

U.S. PATENT DOCUMENTS

| | | | |
|---|---|---|---|
| 4,527,283 | 7/1985 | Ito et al. | 382/9 |
| 4,558,461 | 12/1985 | Schlang | 382/9 |
| 4,776,024 | 10/1988 | Katoh et al. | 382/9 |
| 4,855,933 | 8/1989 | Kondo | 382/56 |
| 4,891,750 | 1/1990 | Pastor et al. | 382/21 |
| 4,953,230 | 8/1990 | Kurose | 382/9 |

Primary Examiner—David K. Moore
Assistant Examiner—Michael Cammarata
Attorney, Agent, or Firm—Mason, Fenwick & Lawrence

[57] ABSTRACT

A method and an apparatus for isolating an area corresponding to a character or word in an optical character recognition device. Original manuscript images are compressed (reduced) in a scanning direction corresponding to the direction of the original manuscript image's line (column), and areas where the black picture elements corresponding to the compressed original manuscript images are connected with each other are searched by following the contour of the areas of connected black picture elements contained in the compressed images. Then, a minimum coordinate point and a maximum coordinate point are obtained in accordance with the areas determined by searching, and rectangular areas determined by the minimum coordinate point and the maximum coordinate point of the area where the black picture elements are connected with each other are extracted. Finally, each area of the original manuscript images corresponding to the extracted rectangular areas is isolated as an area of image.

27 Claims, 6 Drawing Sheets

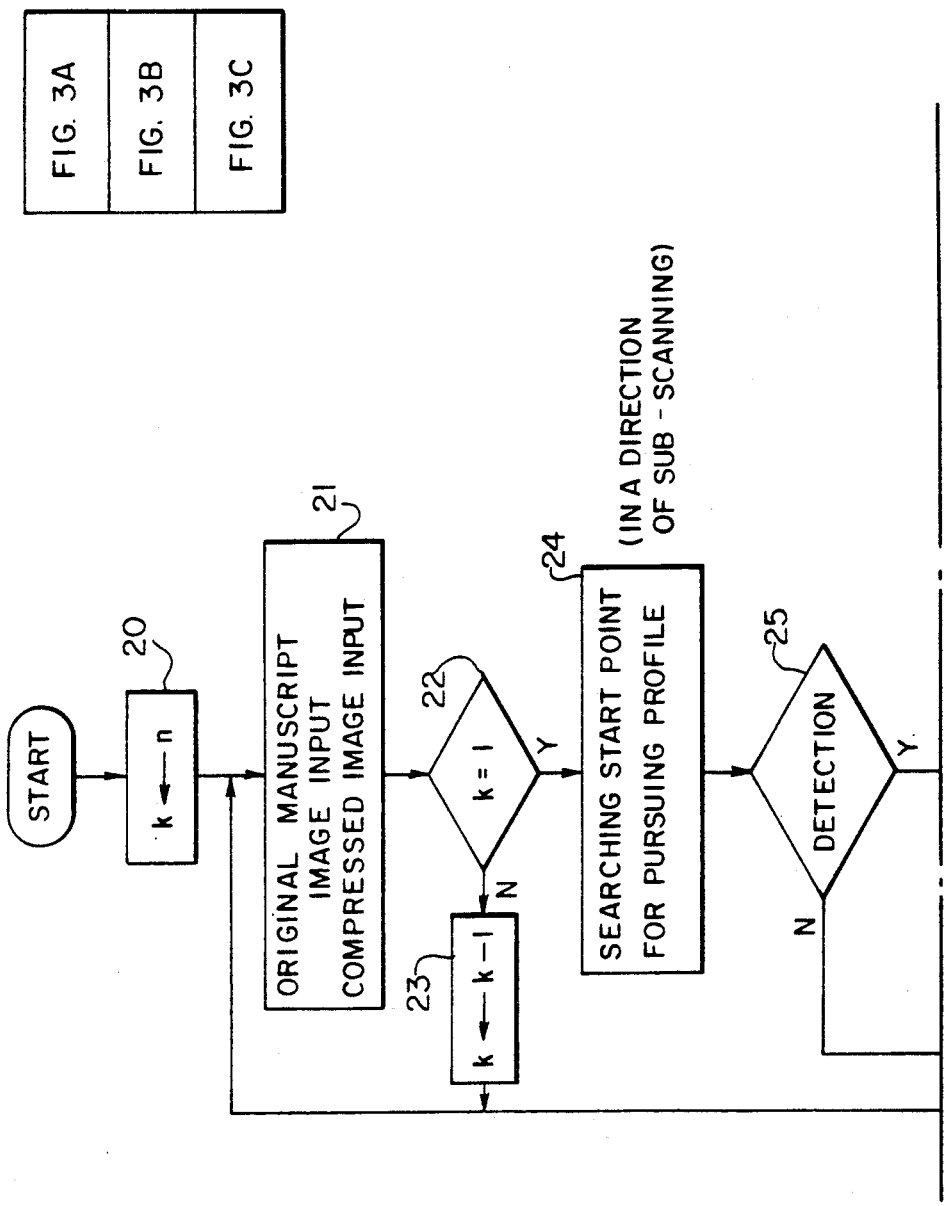

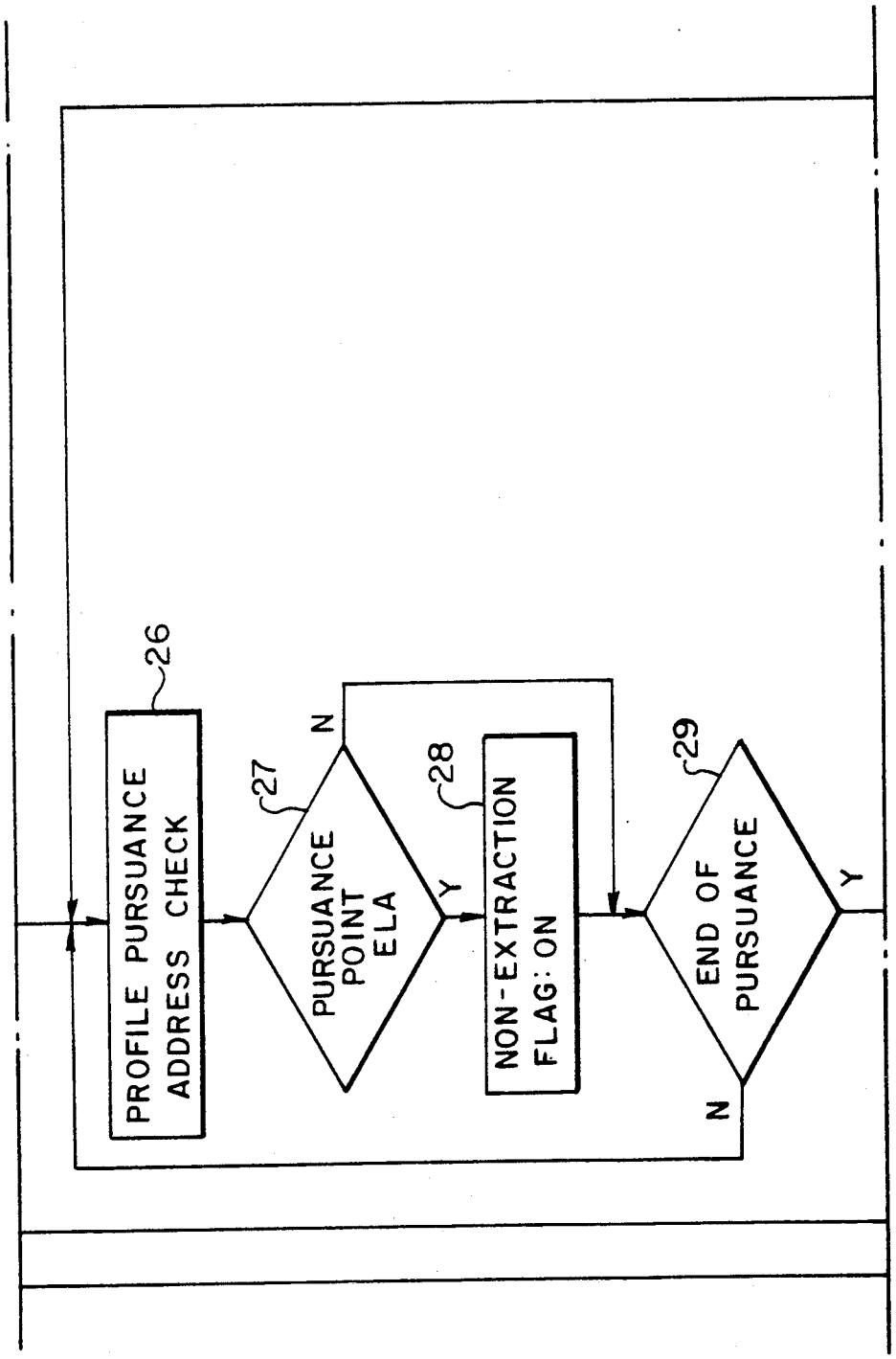

FIG. 4

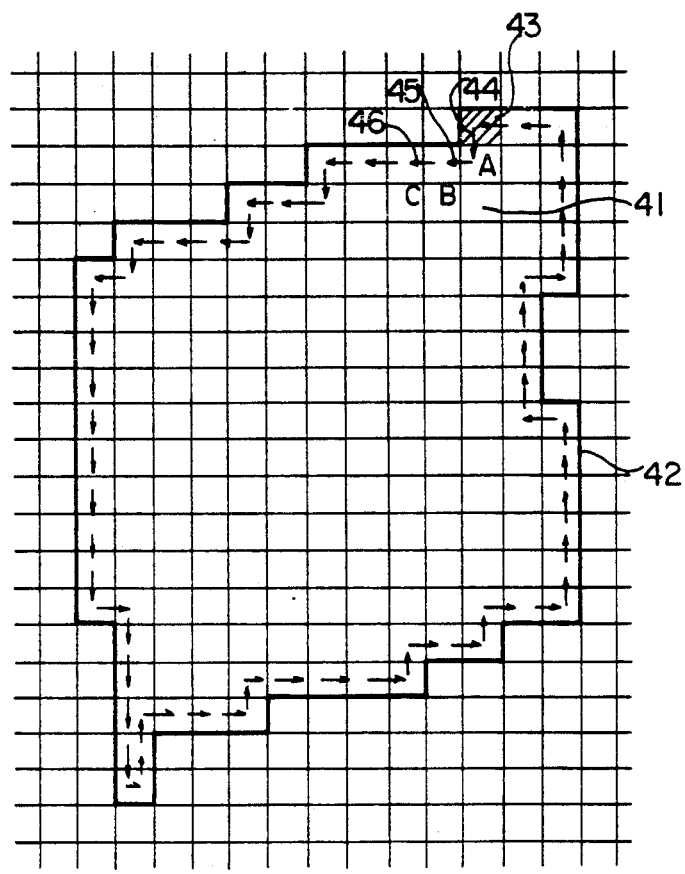

FIG. 6

The volume or heat generated by wetting wood is known to be to the volume or liquid sorbed. Since that volume is relate the volume or swelling, we would logically expect the heat wetting to be related to the volume of swelling. I propose test this hypothesis by comparing the volume of heat genera by wetting wood in various organic liquids with volume swelling these liquids produce in wood.

METHOD AND AN APPARATUS FOR ISOLATING AN AREA CORRESPONDING TO A CHARACTER OR WORD

CROSS-REFERENCE TO RELATED APPLICATION

This is a continuation-in-part of U.S. Ser. No. 7/161,142, filed Feb. 26, 1988, now abandoned.

BACKGROUND OF THE INVENTION

The present invention relates to a method and an apparatus for isolating an area corresponding to a character or word in an optical character recognition (OCR) device, such as a character recognition reader, or the like. The term "cut down" or "isolate" is defined as segmenting the area corresponding to a character or word and taking it out.

Up to now, an area corresponding to a character is isolated in an optical character recognition device in the following manner:

First, an original manuscript image to be read-out by a scanner is scanned in the direction of the line (or column) of the character image in order to obtain a projection towards an axis perpendicular to the line of the character image, and an area of continuing projection wider than a certain constant value (i.e., an area of the projection is obtained by summing up the number of the black picture elements while continuing over a range wider than a certain predetermined width) is isolated as one line. Next, the isolated line is scanned in a vertical direction in order to obtain a projection towards an axis parallel to the line of the character image, and then an area of the continuing projection wider than another certain constant value is isolated as one character in the same way as mentioned above. However, if the original manuscript is inclined considerably, the projection toward the axis perpendicular to the line of the character image continues over a range of a plurality of lines, so that the operation of isolating the area of the respective lines cannot be normally performed. As a result, the operation of isolating the areas corresponding to the characters cannot be normally performed either. Although the problem of character isolation has been described heretofore, there is also a problem with regard to word isolation. Such problems as discussed above arose in the prior art.

SUMMARY OF THE INVENTION

Consequently, it is a primary object of the present invention to provide a method and an apparatus for isolating the area corresponding to characters or words which are capable of normally isolating the area thereof even from an original manuscript, the image of which is considerably inclined. In order to attain the above-mentioned object, in a preferred embodiment of the present invention, the image of the original manuscript which is formed by black picture elements corresponding to characters or words is compressed (reduced) in a scanning direction corresponding to the direction of the original manuscript image's line and the area where the black picture elements of the compressed original manuscript images are connected with each other is extracted by searching the continuity of the black picture elements contained in the compressed image. Further, the areas of the original manuscript images corresponding to the extracted areas are isolated as areas of the character or word images, respectively.

BRIEF DESCRIPTION OF THE DRAWINGS

FIGS. 3, 3A, 3B and 3C are flow charts of the character isolation method of the invention, from the first line of the characters to the final line of characters (page end) according to the present invention.

FIG. 4 is a diagrammatic view illustrating an example of the procedure for following the contour of a group of black picture elements corresponding to the character or word image portion.

FIG. 6 is a diagrammatic view illustrating the word isolation method according to the present invention.

DETAILED DESCRIPTION OF THE PREFERRED EMBODIMENTS

Figure 1:
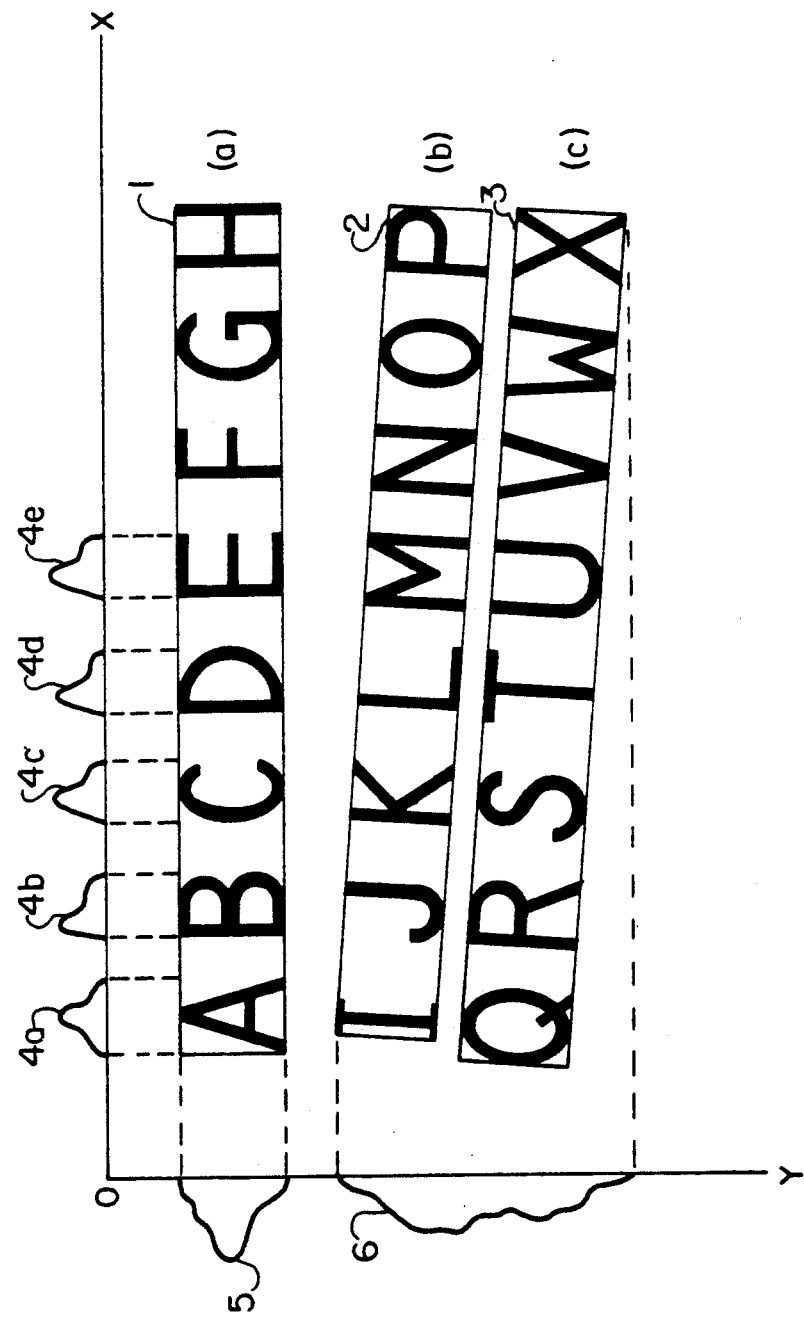
FIG. 1 is a diagrammatic view illustrating a method of isolating the characters according to the prior art.

FIG. 1 is a diagrammatic view showing in more detail the prior art method of isolating the area corresponding to a character. There are shown in FIG. 1 an area 1 of a horizontal (not inclined) character image's line (a), an area 2 of an inclined character image's line (b), and an area 3 of another inclined character image's line (c), which is parallel with the line (b). The original manuscript image consisting of black picture elements forming the characters is scanned by a scanner in the direction of the character image's line to obtain a projection 5 along the Y axis perpendicular to the character image's line. The projection can be obtained by summing up the number of the black picture elements. Its area continuing over a range wider than a certain predetermined width in the vertical direction as discussed above is isolated as one line as shown by the horizontal (not inclined) character image's line (a). Next, the isolated line (a) is scanned by the scanner in the vertical direction to obtain projections 4a, 4b, 4c, 4d, 4e, etc., along the x axis parallel to the character image's line in like manner. Then, the area of the continuing projection wider than a certain constant value is isolated as one character. However, if both of the character lines (b) and (c) represented by the reference numerals 2 and 3, respectively, are not completely horizontal (i.e., if they are both inclined), the projections thereof along the Y axis are united into one projection 6, so that the area of the character image's line cannot be isolated normally. Consequently, it may be impossible to perform the operation of character isolation in the normal manner.

A preferred embodiment of the present invention for solving such problems as discussed above will be explained hereinafter with reference to the accompanying drawings.

Figure 2:
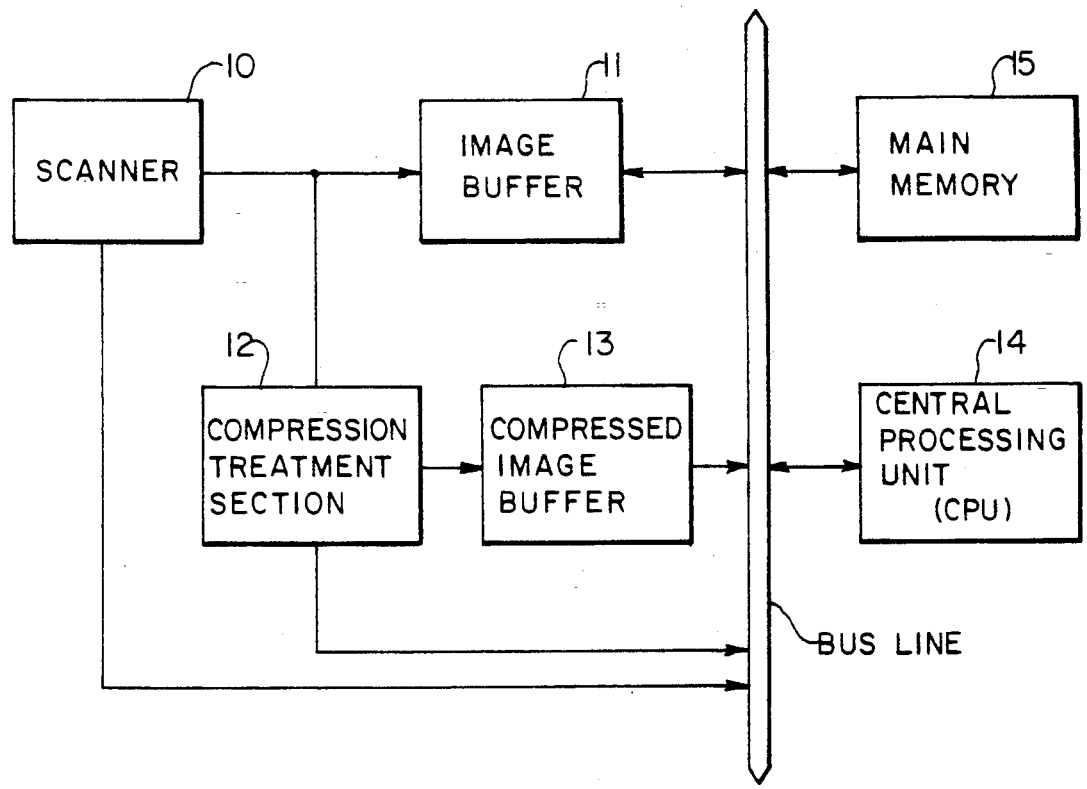
FIG. 2 is a block diagram showing the main components of an embodiment of a character recognition device according to the present invention.

FIG. 2 is a block diagram showing the main components of an embodiment of a character recognition device applied to the present invention. In FIG. 2, there are shown a scanner 10 for reading out the original manuscript image, an image buffer 11 for storing the data of the original manuscript image read-out by the scanner 10, a compression treatment section 12 for compressing the data of the original manuscript image in a main scanning direction (a direction corresponding to that of the original manuscript's character line), and a compressed image buffer 13 for storing the image data compressed by the compression treatment section 12. All of scanner 10, buffers 11 and 13 and compression treatment section 12 are conventional.

Both the image buffer 11 and the compressed image buffer 13 are conventional ring buffers. When either one or both of the buffer 11 or 13 is completely filled with image data, the address of the buffer returns to its initial value, and then the previously stored data are overwritten; i.e., the previously stored data are erased therefrom and the new data are stored therein simultaneously. In a preferred embodiment of the present invention, the image buffer 11 has the memory capacity of a line buffer and the compressed image buffer 13 has a memory capacity corresponding thereto.

The compression treatment section 12 performs an OR logic operation of the image data in units of several successive bits and thereby produces the compressed image data. However, other compression treatment methods can be also adapted for producing the compressed image data instead of the above.

In the case where the area of the character image is to be isolated in units of one character, the rate of compression is selected such that the black picture elements constituting one character are connected to each other, while the black picture elements constituting adjacent characters are not connected to each other. In contrast, in the case where the area of the character image is to be isolated in units of one word, the rate of compression is selected such that the black picture elements constituting one word are connected to each other, whereas the black picture elements of adjacent words are not connected to each other.

In the present invention, a proportional compression method is adopted instead of other methods which compress only the blank portions in relation to run length, as is done in the case of facsimile devices, etc. There are several types of known proportional compression methods, for instance:

(1) The OR logic operation method;
(2) The threshold operation method; and
(3) The thinning-out operation method.

In the OR logic operation method (1), compression is done by performing the OR logic operation in units of several successive bits. This method is described hereinafter, as an example. As described above, the compression treatment section 12 (FIG. 1) performs an OR logic operation of image data in consecutive "units" along a scan line, each of the units comprising several successive pixels. By performing and OR operation on the pixels in each of the units, a respective set of output pixels are provided by the compression treatment section 12. As is readily apparent to those skilled in the art, generation of a single pixel based on input units of several pixels produces a number of output pixels which is a predetermined fraction of the number of input pixels, so that the compression method is "proportional". This proportional compression is in contrast to run-length encoding commonly employed in facsimile devices.

In the threshold operation method (2), compression is done by performing a modified OR operation using a threshold value. Thus, OR logic operation (1) is a special case of threshold operation method (2) in which the threshold value is equal to 1.

In the thinning-out operation method (3), compression is done by thinning-out a predetermined number of dots contained in another predetermined number of total dots making up the character image in accordance with a specified rule.

The use of compression in the present invention enables the black picture elements forming the image area of the character or the word to be connected as one continuous image. The ratio of compression is within a suitable range to accomplish this result. Insufficient or excessive compression hinders the normal isolation process recording to the invention by preventing this connecting of the image area.

In FIG. 2, there are shown a controller 14, such as a central processing unit (CPU), for performing the character isolation treatment and the control of respective blocks, or the like, and a main memory 15 for storing the program or the data. Controller 14 and memory 15 are also conventional.

FIGS. 3, 3A, 3B and 3C are flow charts showing in a simplified way the steps of the character isolation method. Referring to the flow charts, the character isolation method is explained hereinafter.

Steps 20 Through 23

Under the control of the controller or CPU 14, the original manuscript image data are input serially from the scanner 10 into the image buffer 11 in units of one raster line in order to store the data therein and, simultaneously, the image data compressed by the compression treatment section 12 are also serially input into the compressed image buffer 13 in order to store the compressed image data therein. Until a constant amount of the original manuscript image data (raster lines of data on this occasion) are input thereinto, the inputting operation is repeated (Step 21).

Moreover, the end line addresses (ELA) which are readout by each buffer in the sub-scanning direction are memorized in the specified addresses of the main memory 15.

Steps 24 And 25

The image area corresponding to the image data memorized in the compressed image buffer 13 is raster-scanned in the sub-scanning direction from the start point of the raster scan (initially, the upper position address of the compressed image buffer). The raster-scanning operation is performed for the purpose of searching for the black picture elements (Step 24). When an area of connected black picture elements is detected for the first time, the procedure advanced to Step 26. When no black picture elements are detected, the procedure advances to Step 37 (Step 25).

Steps 26 Through 34

Starting from the start point of the area of connected black picture elements detected through the procedure of Step 24, the continuity of the area of connected black picture elements is searched, and thereby the black picture elements connected with each other are followed. Specifically, the contour of a group of black picture elements corresponding to the character image portion is followed from the start point of the black picture elements (Step 26).

FIG. 4 schematically illustrates an example of the procedure for following the contour of an area of connected black picture elements. In FIG. 4, there are shown an area 41 of connected black picture elements, the contour 42 thereof, a start point 43 thereof, and arrows 44, 45 and 46, respectively, showing in order the directions, A, B and C in which the contour is followed.

Since the method of following the contour is well-known, a detailed explanation thereof is omitted here.

After the process of following the contour of the profile has been finished, the addresses of the respective maximum points and the respective minimum points in the main scanning and sub-scanning directions are stored in the main memory 15 one after another. When the contour-following operation returns to the start point 43 thereof, it is finished with respect to the pursuing operation for the area of connected black picture elements corresponding to one character (Step 29 . A rectangular area having an apex of the minimum main and sub-scanning addresses and another opposing apex of the maximum main and sub-scanning addresses is extracted in such a way.

Moreover, the position of the scanner spot and the end line address (ELA) are compared with each other while the contour of the area of connected black picture elements is being followed (Step 27). When they coincide with each other, a non-extraction flag is set to the "ON" state, and the pursuance of the contour continues along the end line address ELA and returns to the start point of the contour-following operation (Step 28).

One bit among the specified byte of the main memory 15 can be utilized as the non-extraction flag. The nonextraction flag is turned on when a part of the area of connected black picture elements portion, the contour of which is being followed, is not to be stored in the compressed image buffer 13.

When the contour-following operation for one area of connected black picture elements is finished, the ON-OFF state of the non-extraction flag is judged (Step 30).

If the non-extraction flag is turned on, i.e., if the pursuing point arrives at the end line address ELA, none of the area of the connected black picture elements is extracted, because not all of the area of the connected black picture elements is stored in the main memory 15. However, the maximum and minimum addresses of the pursuing point are stored in the main memory 15. A minimum subscanning line address $L_{min}$ is detected among the pursuance points of all areas of connected black picture elements where the non-extraction flag is turned on, namely, the area is not extracted, and $L_{min}$ is memorized in a specified address of the main memory 15 (Step 31).

Next, a point having the maximum main scanning address of the scanner spot location, plus one and the minimum sub-scanning address of the scanner spot location, is established as the start point of the next raster scan (Step 32). The operation of the next raster scan is performed starting from the new start point in the direction of main scanning. Then, the start point of the next corresponding area of black picture elements is located by performing the raster-scan in the main scanning direction. In such a way, the start point of the area of connected black picture elements corresponding to the next character is detected (Step 33). When the start point is detected, the process begins over again starting from Step 26. When it is not detected, the process advances to Step 37.

On the other hand, when the contour-following operation for the area of connected black picture elements corresponding to one character image finishes, since the non-extraction flag is kept in the "OFF" state, the operation proceeds to Step 35.

Steps 35 and 26

The area of the original manuscript image corresponding to the area extracted from the compressed image is isolated from the image buffer 11 and sent to a character-recognizing section (not shown in FIG. 2) (Step 35). Further, the termination of the isolation operation of the final character is one manuscript line (corresponding to n raster spot lines) is detected (judged) by checking the main and sub-scanning addresses of the isolation area (Step 36). When the non-termination of the operation is detected (judged), the operation returns to Step 32 and starts the isolation treatment of the next character. When the termination of the operation is detected (judged), the operation proceeds to Step 37.

Steps 37 And 38

Whether the isolation operation of the character has reached the final line of the manuscript is detected (judged) (Step 37). When the termination of the character isolation is detected (judged), the process finishes. When the non-termination of the character isolation is detected (judged), the number "k" of spot lines to be input into the image buffer 11 and the compressed image buffer 13 is established all over again by the equation:

$$k = n - (ELA - L_{min})$$

and the operation from Step 21 is started once again. In the equation, ELA signifies the end line address of a character line N, $L_{min}$ signifies the minimum sub-scanning address of the next character line N+1, and n signifies the height in raster spot lines of character line N+1.

Figure 5:
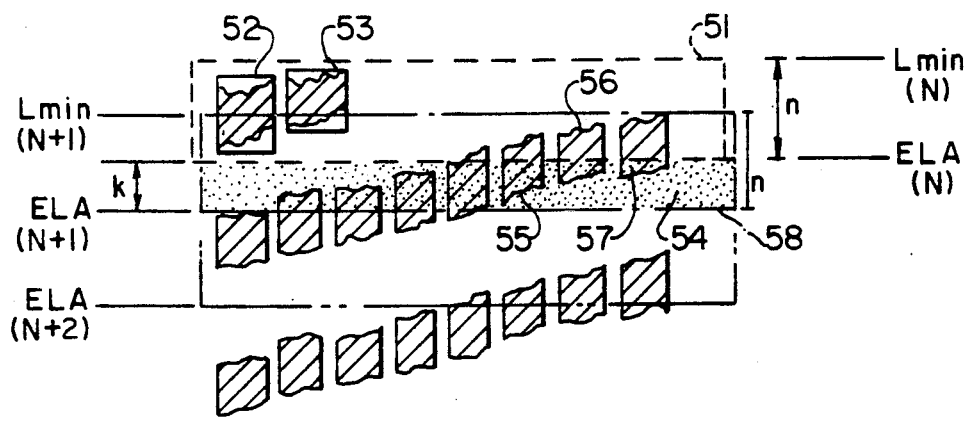
FIG. 5 is a diagrammatic view illustrating the character isolation method according to the present invention.
Figure 3C:
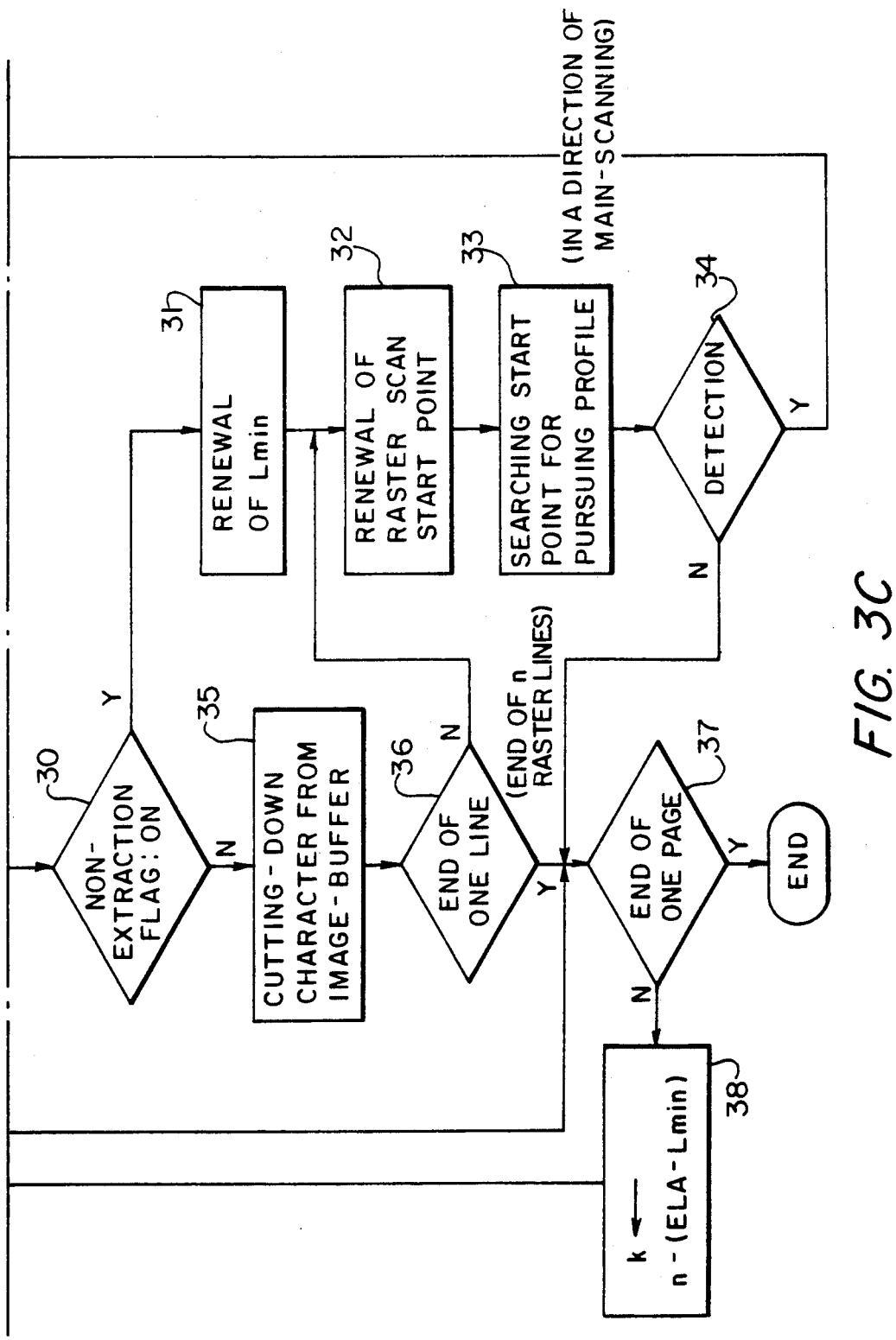

FIG. 5 is a diagrammatic view explaining the operation of extracting the area of connected black picture elements of the compressed image. In FIG. 5, there are shown extraction areas 51, 58 and 59 of the character lines "N", "N+1" and "N+2", respectively.

When the n raster lines of compressed image data of the area 51 of the character line N are stored in the compressed image buffer 13, the areas 52 and 53 of the connected black picture elements situated at the left side in the area 51 are respectively extracted by use of a contour-following operation. The minimum sub-scanning address $L_{min}$ of the area of connected black picture elements, which is not to be extracted at this stage, is as shown in FIG. 5. Specifically, since the area of connected black picture elements of the compressed image contains ELA therein, the non-extraction flag is switched to the ON state, and thereby none of the image is extracted. A part of the area of connected black picture elements is outside of the extraction area having a height of n raster lines. The minimum sub-scanning line address $L_{min}$ of the areas of connected black picture elements (for instance, 55, 56 and 57), i.e., of the next character line N+1 area, is as shown in FIG. 5.

Here, the minimum sub-scanning address $L_{min}$ of the next character line N+1 is set as the upper line, and the compressed image data of k lines continues to be stored in the compressed image buffer 13, starting from the end line address ELA of the character line N and ending at the end line address ELA of the next character line N+1, so as to store all of the data within a height of n raster lines (i.e., one manuscripts line). As mentioned heretofore, the areas 55, 56 and 57 of the connected black picture elements not extracted previously are extracted at this time.

The operation is then repeated for succeeding character lines. Here, in FIG. 5, the equation:

$$k = n - (ELA - L_{min})$$

is illustrated, where "n" again signifies the entire height in raster lines of the area of character line N+1, "k" again signifies the height in raster lines of an area to be added from the area of the next character line N+1, because the area corresponding to the character could not be previously extracted, "ELA" again signifies the end line address of the area of the previous character line N, and "$L_{min}$" again signifies the minimum sub-scanning line address of the area of the next character line N+1. Further, an area 54 including therein fine dots as shown in FIG. 5 represents an area to be added from the area of the next character line N+1, because the area of the character could not be previously extracted.

In FIG. 5, when the contour-following operation for an area of the connected black picture elements can finish in the area 51, this terminates the image (character or word) area isolation process. If the contour-following operation or the area of connected black picture elements cannot finish in the area 51, another area of a height k is added and the contour-following operation is initiated in the area 58. If the contour-following operation can finish in area 58, this terminates the isolation process. If it cannot do so, another area of a height k is added and the contour-following operation is initiated once again, in the area 59. The contour-following operation is thus repeated in order several times.

An embodiments of the present invention has been described heretofore. However, the present invention is not limited thereby to the aforementioned embodiment only. In the embodiment described herein according to the present invention, the apparatus for isolating the area of characters comprises line buffers constituting an image buffer and a compressed image buffer. However, it is possible to provide page buffers instead, and the original manuscript image data and the compressed image data can be input into the respective page buffers in units of one page, and then the operation is carried out as previously described. In such a case, the control of the buffer's address can be easily done, as will be recognized by those of skill in the art.

Furthermore, although the embodiment described herein is constructed with a device which performs the character-isolation operation using software, it is also possible to perform the operation of isolating a part or all of the characters (image areas) by the use of hardware.

Heretofore, the method and apparatus for isolating characters in units of one character have been described with the intention of processing the Chinese characters of the Chinese or Japanese language. However, the apparatus can be applied to the isolation of character in units of one word, as in the case in processing characters of the European languages, including letters of the alphabet, symbols or numerals. Specifically, in the case of processing an inclined European language manuscript as shown in FIG. 6, an area of connected black picture elements as the compressed image (such as areas 52, 53, 55, 56 and 57 in FIG. 5) can be considered to correspond to one word.

In FIG. 6, there are shown an optional rectangular area 61 parallel with the raster scanning line (the main scanning line), and several inclined lines 62 of words. If an area of the original manuscript image corresponding to the area in which the black picture elements in the compressed image are connected with each other is isolated as described heretofore, the isolated area represent one word.

As is apparent from the foregoing description, in accordance with the present invention, an area corresponding to the character image is extracted from the compressed image, and the area of the original manuscript image corresponding to the extracted area is isolated as a character or word. For this reason, unlike the conventional method of the prior art which utilizes projections, it is possible to isolate the character or the word from a considerably inclined original manuscript image using the normal isolation operation. Consequently, if the present invention is applies to a character recognition device, the rate of character recognition for an inclined original manuscript can be sharply improved.

Obviously, various additional modifications and variation of the present invention will be obvious to those skilled in the art after receiving the teachings of the present disclosure without departing from the scope thereof.

What is claimed is:

1. A method for isolating a distinct image area in an original manuscript having characters arranged in a line, the method comprising the steps of:
   (a) reading out images from the original manuscript;
   (b) storing said read-out images in an image buffer;
   (c) proportionally compressing said read-out images in a direction of scanning corresponding to the line in which the characters are arranged, to form one or more respectively continuous areas of connected black picture elements corresponding to compressed images;
   (d) searching the continuous area of black picture elements to determine coordinates where said black picture elements are connected with each other;
   (e) obtaining a minimum coordinate point and a maximum coordinate point in accordance with said determined coordinates;
   (f) extracting a rectangular area determined by said minimum coordinate point and said maximum coordinate point; and
   (g) isolating the extracted rectangular area as the distinct image area.

2. The method of claim 1, wherein the distinct image area is a character.

3. The method of claim 1, wherein the distinct image area is a word.

4. The method of claim 1, wherein said reading-out step (a) includes scanning the images.

5. The method of claim 1, wherein said proportionally compressing step (c) includes an OR logic operation.

6. The method of claim 1, wherein said proportionally compressing step (c) includes an threshold operation.

7. The method of claim 1, wherein said proportionally compressing step (c) includes a thinning-out operation.

8. The method of claim 1, wherein said obtaining step (e) and said extracting step (f) include a contour-following method.

9. An apparatus for isolating a distinct image area in an original manuscript having characters arranged in a line, the apparatus comprising:
   (a) scanning means for reading out the images from the original manuscript;
   (b) image buffer means for storing the images read out by said scanning means as original manuscript image data;
   (c) compression treatment means for proportionally compressing said read-out images from the original manuscript in a direction of scanning corresponding to the direction of the line in which the characters are arranged, to form one or more respectively continuous areas of connected black picture elements corresponding to compressed images;
   (d) compressed image buffer means for storing the one or more compressed images as compressed image data;
   (e) main memory means for storing programs for controlling a central processing unit, said main memory means also being employed as a work area; and
   (f) control means for:
      (1) searching the continuous areas of black picture elements to determine coordinates where said black picture elements are connected with each other;
      (2) obtaining a minimum coordinate point and a maximum coordinate point in accordance with said determined coordinates;
      (3) extracting a rectangular area determined by said minimum coordinate point and said maximum coordinate point; and
      (4) isolating the extracted rectangular area as the distinct image area.

10. The apparatus of claim 9, wherein:
said image buffer means and said compressed image buffer means each comprise a line buffer; and
said original manuscript image data and said compressed image data are stored in said line buffers in units of one character line.

11. The apparatus of claim 9, wherein:
said image buffer means and said compressed image buffer means each comprise a page buffer; and
said original manuscript image data and said compressed image data are stored in said page buffers in units of one or more pages.

12. The apparatus of claim 9, wherein said control means isolates the distinct image area in units of one word.

13. The apparatus of claim 9, wherein said control means isolates the distinct image area in units of one character.

14. A method for segmenting a character string, the character string including one or more alphanumeric characters read from the document, the method comprising the steps of:
   (a) storing into a first memory means image information formed by:
      (1) scanning an original document to provide scanned information; and
      (2) quantizing the scanned information into a black level or a white level to form the image information;
   (b) compressing the image information at a predetermined compression rate in a horizontal direction to form compressed image information;
   (c) storing the compressed image information into a second memory means;
   (d) tracing a contour portion of a group of successive black picture elements included in the compressed image information stored in the second memory means;
   (e) extracting respective coordinate values of apexes of a rectangular region circumscribed about the group of successive black picture elements;
   (f) multiplying the coordinate values of the respective apexes by a reciprocal of the predetermined compressing rate to provide multiplied coordinate values to the first memory means; and
   (g) segmenting the character string from the image information stored in the first memory means based on the multiplied coordinate values formed in the multiplying step.

15. A method for isolating distinct image areas in an original manuscripts having characters arranged in a line, the method comprising the steps of:
   (a) reading out images from the original manuscript;
   (b) storing said read-out images in an image buffer;
   (c) proportionally compressing said read-out images in a direction of scanning corresponding to the line in which the characters are arranged, to from respectively continuous areas of connected black picture elements corresponding to compressed images;
   (d) searching the continuous areas of black picture elements to determine coordinates where said black picture elements are connected with each other;
   (e) obtaining a minimum coordinate point and a maximum coordinate point in accordance with said determined coordinates;
   (f) extracting rectangular areas determined by said minimum coordinate point and said maximum coordinate point; and
   (g) isolating the extracted rectangular areas as the distinct image areas.

16. The method of claim 15, wherein the distinct image areas are characters.

17. The method of claim 15, wherein the distinct image areas are words.

18. The method of claim 15, wherein said reading-out step (a) includes scanning the images.

19. The method of claim 15, wherein said proportionally compressing step (c) includes an OR logic operation.

20. The method of claim 15, wherein said proportionally compressing step (c) includes a threshold operation.

21. The method of claim 15, wherein said proportionally compressing step (c) includes a thinning-out operation.

22. The method of claim 15, wherein said obtaining step (e) and said extracting step (f) include a contour-following method.

23. An apparatus for isolating a distinct image areas in an original manuscript having characters arranged in a line, the apparatus comprising:
   (a) scanning means for reading out the images from the original manuscript;
   (b) image buffer means for storing the images read out by said scanning means as original manuscript image data;
   (c) compression treatment means for proportionally compressing said read-out images from the original manuscript in a direction of scanning corresponding to the direction of the line in which the characters are arranged, to form respectively continuous areas of connected black picture elements corresponding to compressed images;
(d) compressed image buffer means for storing the one or more compressed images as compressed image data;
(e) main memory means for storing programs for controlling a central processing unit, said main memory means also being employed as a work area; and
(f) control means for:
  (1) searching the continuous areas of black picture elements to determine coordinates where said black picture elements are connected with each other;
  (2) obtaining a minimum coordinate point and a maximum coordinate point in accordance with said determined coordinates;
  (3) extracting rectangular areas determined by said minimum coordinate point and said maximum coordinate point; and
  (4) isolating the extracted rectangular areas as the distinct image areas.

24. The apparatus of claim 23, wherein:
said image buffer means and said compressed image buffer means each comprise a line buffer; and
said original manuscript image data and said compressed image data are stored in said line buffers in units of one character line.

25. The apparatus of claim 23, wherein:
said image buffer means and said compressed image buffer means each comprise a page buffer; and
said original manuscript image data and said compressed image data are stored in said page buffers in units of one or more pages.

26. The apparatus of claim 23, wherein said control means isolates the distinct image areas in units of one word.

27. The apparatus of claim 23, wherein said control means isolates the distinct image areas in units of one character.

* * * * *